Figure 1:
Figure 2:

H. BEGUELIN.
ADJUSTABLE WATCH KEYS.

No. 179,506. Patented July 4, 1876.

UNITED STATES PATENT OFFICE.

HENRY BEGUELIN, OF SAN FRANCISCO, CALIFORNIA, ASSIGNOR TO S. FARJEON AND J. DINKELSPIEL, OF SAME PLACE.

IMPROVEMENT IN ADJUSTABLE WATCH-KEYS.

Specification forming part of Letters Patent No. 179,506, dated July 4, 1876; application filed November 27, 1875.

*To all whom it may concern:*

Be it known that I, HENRY BEGUELIN, of San Francisco city and county, State of California, have invented an Improved Adjustable Watch-Key; and I do hereby declare the following description and accompanying drawings are sufficient to enable any person skilled in the art or science to which it most nearly appertains to make and use my said invention or improvement without further invention or experiment.

The object of my invention is to provide certain improvements in that class of watch-keys which are made to be adjusted to fit any sized post; and it consists in the formation of two flat plates, which are riveted together to form the thumb-piece or handle.

The stem is formed by a continuation of these two pieces, drawn down to the proper shape, and the socket is formed one-half in each part of the post. The stem is made in the form of a double frustum of a cone, and a sliding ring is fitted to the part of the cone nearest the handle. By sliding the ring back the parts of the stem are allowed to open, and they are closed by moving it forward.

Referring to the accompanying drawing for a more complete explanation of my invention, A is the handle of my key, which is formed of two flat plates riveted together. These plates are stamped out so as to form one-half of the handle and stem each, and when the two halves of the stem $b$ are finished, and a V-shaped groove is made in the end of each, they are riveted together, so that one-half of the socket will be contained in each part of the stem. The halves of the handle are so made that when riveted together the ends forming the stem will spring apart about enough to fit a large key-post.

In order to reduce or adjust this opening, I form the parts $b$ like a double frustum of a cone, the bases meeting at $c$ in the middle of the stem, and I fit a ring, $d$, to the cone nearest the handle, as shown. This ring is small enough so that it will not pass the point $c$, and when moved up toward that point it will compress the two halves, so as to adjust the key to any post.

The operation will be simply to place the key, while fully open, upon the post, and by pushing the ring down until the parts clasp the post, it will be adjusted to the size of post to which it is applied.

A groove is turned around the ring to receive a loose ring, $e$, by which to attach the key to a chain or key-ring.

I am aware that various adjustable keys have been made having divided stems, and I do not, therefore, claim broadly this feature; but What I do claim as new, and desire to secure by Letters Patent, is—

A watch-key having the flat thumb-piece or handle A and stem $b$, made in two halves, and riveted together, forming an elastic self-opening stem, the stem made tapering, with an enlargement at $c$, in combination with the sliding adjusting-ring $d$, all constructed and arranged to operate in the manner substantially as and for the purpose specified.

HENRY BEGUELIN.

Witnesses:
 GEO. H. STRONG,
 JNO. L. BOONE.